（12） United States Patent
Nakamura et al.

(10) Patent No.: US 7,640,080 B2
(45) Date of Patent: Dec. 29, 2009

(54) PROTECTION DEVICE FOR LOAD CIRCUITS

(75) Inventors: Yoshihide Nakamura, Shizuoka-ken (JP); Akiyoshi Kanazawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 237 days.

(21) Appl. No.: 11/783,931

(22) Filed: Apr. 13, 2007

(65) Prior Publication Data

US 2007/0253132 A1 Nov. 1, 2007

(30) Foreign Application Priority Data

Apr. 27, 2006 (JP) .......................... P2006-123544

(51) Int. Cl.
*G05D 23/00* (2006.01)
*H02H 5/04* (2006.01)

(52) U.S. Cl. ........................................ 700/299; 361/24
(58) Field of Classification Search ................. 700/299; 337/1, 2, 14, 299, 300, 304, 417; 361/5, 361/42, 85, 87, 93.9
See application file for complete search history.

(56) References Cited

U.S. PATENT DOCUMENTS

| 5,418,677 | A | * | 5/1995 | Engel ........................... 361/25 |
|---|---|---|---|---|
| 5,644,510 | A | * | 7/1997 | Weir ........................... 702/132 |
| 5,838,591 | A | * | 11/1998 | Yamaguchi ................. 700/299 |
| 5,861,610 | A | * | 1/1999 | Weiss .......................... 219/497 |
| 5,875,087 | A | * | 2/1999 | Spencer et al. ................. 361/87 |
| 5,926,010 | A | * | 7/1999 | Hosokawa et al. ........... 323/222 |
| 6,114,828 | A | * | 9/2000 | Matsunaga et al. .......... 318/782 |
| 6,167,525 | A | * | 12/2000 | Donazzi et al. ............. 361/93.8 |
| 6,222,709 | B1 | * | 4/2001 | Baba ............................ 361/18 |
| 6,320,275 | B1 | * | 11/2001 | Okamoto et al. ........... 307/10.1 |
| 6,335,577 | B1 | * | 1/2002 | Baba ............................. 307/28 |
| 6,563,685 | B2 | * | 5/2003 | Gotzig ........................ 361/187 |
| 6,631,065 | B2 | * | 10/2003 | Sugiyama et al. ........... 361/100 |
| 6,870,720 | B2 | * | 3/2005 | Iwata et al. .................... 361/58 |
| 6,903,533 | B1 | * | 6/2005 | Geren et al. ................. 320/134 |
| 7,050,281 | B2 | * | 5/2006 | Ohta et al. .................. 361/93.9 |
| 7,161,775 | B2 | * | 1/2007 | Schmalz ......................... 361/5 |

(Continued)

FOREIGN PATENT DOCUMENTS

JP 2001045651 A * 2/2001

(Continued)

*Primary Examiner*—Albert DeCady
*Assistant Examiner*—Dave Robertson
(74) *Attorney, Agent, or Firm*—Finnegan, Henderson, Farabow, Garrett & Dunner, L.L.P.

(57) ABSTRACT

A protection device protecting a load circuit by shutting off a power thereof depending on an estimated present temperature of a wire provided in the load circuit to connect a load. The protection device has a first temperature estimation device estimating a rising temperature of a conductor including the wire based on both a current in the conductor and thermal properties of the conductor, a second temperature estimation device estimating a falling temperature of the conductor based on the thermal properties, a third temperature estimation device estimating an arc-induced rising temperature of the conductor when arcing occurs in the conductor, and a fourth temperature estimation device estimating the present temperature of the conductor deduced from the above estimated temperatures. If the estimated temperature exceeds a predetermined allowable temperature, the protection device shut off the power of the load circuit.

4 Claims, 5 Drawing Sheets

U.S. PATENT DOCUMENTS 7,177,130 B2 * 2/2007 Ohshima ............... 361/93.9
7,268,989 B2 * 9/2007 Parker et al. ............ 361/42
7,394,629 B2 * 7/2008 Plemmons et al. ........ 361/23
7,463,462 B2 * 12/2008 Plemmons et al. ........ 361/25
2001/0019299 A1 * 9/2001 Gotzig .................. 337/14

FOREIGN PATENT DOCUMENTS

JP          2002-84654         3/2002

* cited by examiner

ARC-RELATED MAP

| CURRENT i | TEMPERATURE INCREMENT Q(i) |
|---|---|
| 0 ~ i1 | Q1 |
| i1 ~ i2 | Q2 |
| i2 ~ i3 | Q3 |
| i3 ~ i4 | Q4 |
| i4 ~ i5 | Q5 |

PROTECTION DEVICE FOR LOAD CIRCUITS

BACKGROUND OF THE INVENTION

1. Field of the Invention

The present invention is directed to a protection circuit for protecting a load circuit having a power supply, a switch, and a load. The protection device detects an increase of temperature of a conductive wire used therein.

2. Description of the Related Art

A conventional load circuit supplying power to a load such as a bulb, a motor or the like, has a battery and an electric switch (semiconductor switch, etc.) provided between the battery and the load. These components are connected by conductive wires. The load circuit further has a control device to turn on/off the electric switch. Specifically, the control device outputs a drive signal or a stop signal to the electric switch so that the load is driven or stopped.

In the load circuit as described above, a protection function provided by a fuse or the like so as to shut down the power immediately when a current flowing in the load exceeds a predetermined threshold value of the current, so that damage to the load, the wire, the electric switch and the like is avoided.

The protection function as described above can protect the load circuit itself only in a dead short circuit, that is, when the current has apparently exceeds the threshold value. However, it cannot do so in a rare short circuit, which is a state where the current is larger than a normal value, but does not exceed the threshold value.

Under such a rare short circuit condition, temperature of the conductive wire would rise due to Joule heat generated therein. If a heating rate of the wire exceeds a cooling rate thereof, problems such as smoke emission from the wire or burnout of the wire may occur.

To solve such a problem, a protection apparatus is known in Japanese Patent Laid-Open Publication 2002-084654. According to this device, when a current flows in a load, the device calculates Joule heat based on the measured current. When the current does not flow, it calculates radiated heat, and further it calculates heat generated by arcing which occurs just after a power supply has been shut down. If the total heat calculated from the sum of the radiated heat and the generated heat exceeds a predetermined value, the device would shut down a circuit supplying power to the load.

However, the protection apparatus for the load circuit as disclosed above determines whether the load circuit is shut down or not depending on cumulative heat of generated and radiated heat and it does not take into account an effective rate of increase of temperature. That is, if a thick wire was used and the generated heat therefrom was large, temperature of the wire would not rise very much because the heat radiated from the wire sufficiently exceeds the heat generated therein. Consequently, a problem would occur, in which the circuit would be forcibly shut down irrespective of the fact that power can still be applied to the load device.

On the contrary, if a thin wire was used and the amount of generated heat was small, temperature of the wire would unexpectedly rise but the circuit would not be shut down irrespective of substantial smoke emission from the wire and burnout thereof.

SUMMARY OF THE INVENTION

In light of the above-described problems, an objective of the present invention is to provide a protection device for a load circuit, which determines shutdown of the load circuit depending on the temperature of the wire connecting to a load when the above-described rare shot circuit situation occurs.

An aspect of the present invention is to provide a protection device for a load circuit having a power supply, a switch and a load, comprising a current detection device detecting and measuring a current in a conductor connected between the power supply and the load; a first temperature estimation device estimating an increasing temperature of the conductor, when the current is detected by a current detection device; a second temperature estimation device estimating a decreasing temperature of the conductor when the current detection device does not detect the current or detects that the current is being decreased, a third temperature estimation device estimating an arc-induced increase of temperature of the conductor caused by arcing which occurs just after the current has returned to a normal current; a fourth temperature estimation device estimating a present temperature of the conductor based on the estimated increasing, decreasing, and arc-induced increase temperatures; a temperature determination device determining whether the present temperature of the conductor estimated by the fourth temperature estimation device exceeds a predetermined threshold temperature; and a control device that shuts off power to the load circuit when the temperature determination device determines that the present temperature of the conductor exceeds the predetermined threshold temperature, wherein the increasing temperature is estimated base on both the current measured by the current detection device and thermal properties of the conductor; the decreasing temperature of the conductor estimated based on the thermal properties of the conductor; and the arc-induced increase of temperature is estimated based on the current just before the current has returns to normal current.

Further, the thermal properties of the conductor which is used for estimation of the increasing and decreasing temperatures may be a thermal resistivity R thereof and a heat capacity C thereof.

According to the above configuration, when the current measured by the current detection device would increase or be constant, the rising/increasing temperature of the conductor, including a wire and a contact conductor, can be estimated based on both the measured current and the thermal properties of the conductor. When the current detection device does not detect the current or detect the current decreases, the falling/decreasing temperature of the wire can be estimated based on the thermal properties of the conductor. Further, the arc-induced rising/increasing temperature is induced by the arcing that occurs when the current increases and then returns to the normal current. Furthermore, the present temperature of the wire can be estimated by use of the three estimated temperatures described above. If the present temperature of the wire exceeds the predetermined threshold value, the protection circuit determines that the wire could be burned out. If so, it will shut down the power of the load circuit. Accordingly, since this protection circuit's determination is derived from the estimated present temperature of the wire, the shutdown of the load circuit can be accurately performed.

Further, since the thermal resistance R and the heat capacity C of the conductor including the wire, which vary depending on the conductor, is used for the thermal properties for the above estimations, these four temperatures can be accurately estimated, so that it is possible to precisely control the shutdown of the load circuit.

Furthermore, since the estimations of the rising/increasing and the falling/decreasing temperatures of the wire may be estimated based on formulas which show heat generation and heat radiation of the conductor while taking into account the thermal resistance and the heat capacity thereof, the four temperatures can be accurately estimated, so that it is possible to more precisely control the shutdown of the load circuit.

DETAILED DESCRIPTION OF THE PREFERRED EMBODIMENT

Figure 1:
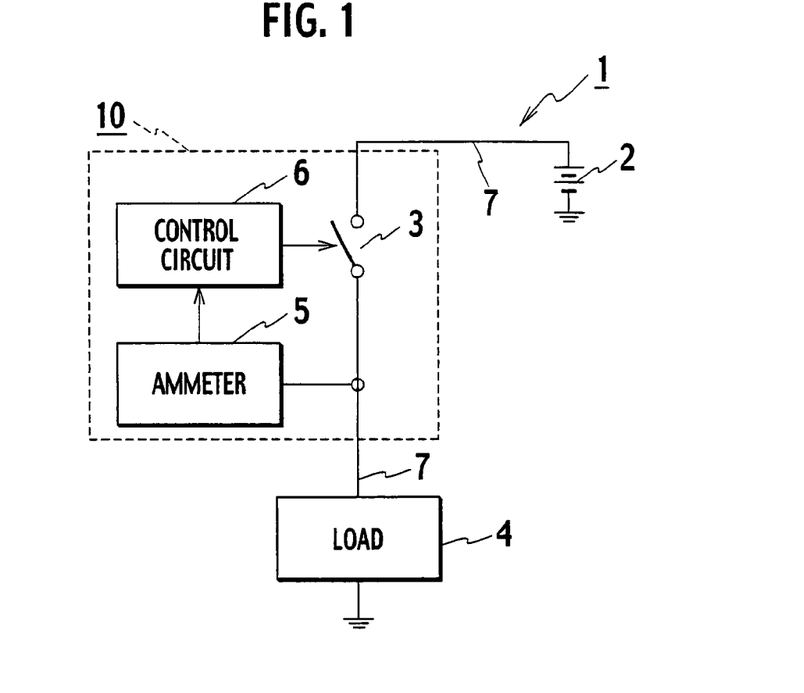
FIG. 1 is a schematic circuit diagram of a load circuit in which an embodiment of a protection device is used.

An embodiment of the present invention will be explained hereinafter with reference to the drawings. FIG. 1 is a circuit diagram of a load circuit in which a protection circuit is used. The load circuit may be used in a vehicle so that a battery provided in the vehicle to supplies power to a load, such as a bulb, a motor or the like.

As shown in the same figure, the load circuit 1 is provided between a battery 2 in a vehicle and a load 4, such as a bulb, a motor and the like. The load circuit 1 has an electrical switch (switch) 3 such as a MOSFET to supply power from the battery 2 to the load 4.

The load circuit 1 further has an ammeter (a current detection device) 5 for detecting and measuring a current flowing to the load 4, and a control circuit 6 for controlling ON and OFF states of the electrical switch 3. Here, the battery 2 is electrically connected to the electrical switch 3 by a wire 7. In the same way, the electrical switch 3 is electrically connected to the load 4 by the wire 7. Accordingly, in this embodiment, a protection circuit 10 for the load circuit includes the electrical switch 3, the ammeter 5 and the control circuit 6.

Figure 2:
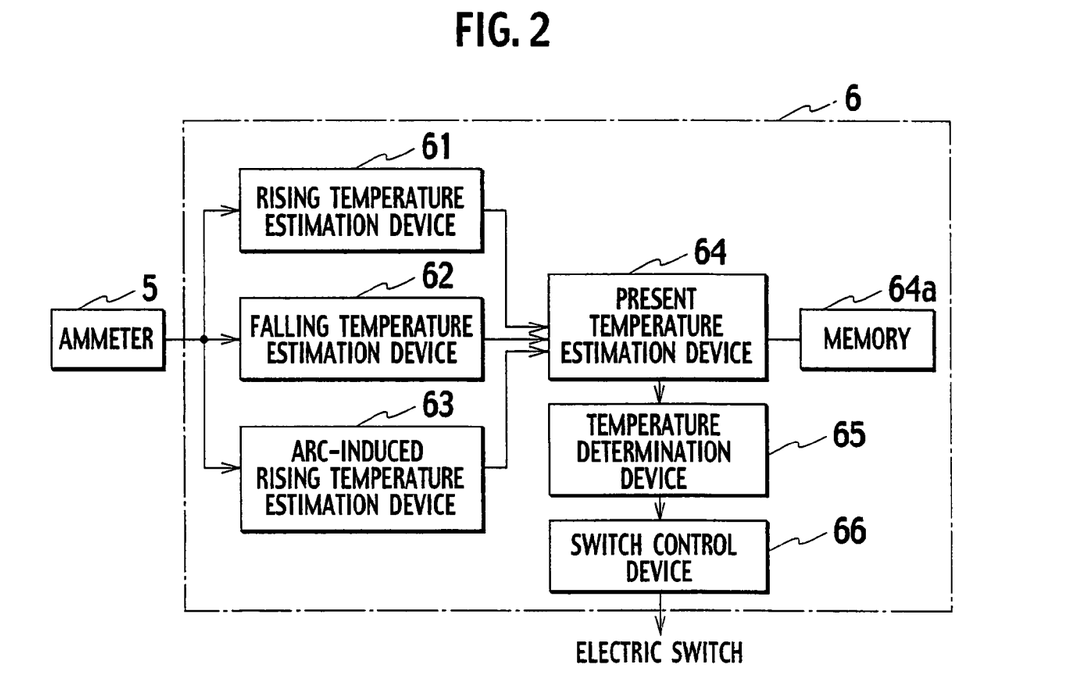
FIG. 2 is a functional block diagram of a control circuit shown in FIG. 1

FIG. 2 is a functional block diagram showing a detailed configuration of the control circuit 6. As seen in this figure, the control circuit 6 comprises a rising/increasing temperature estimation device (a first temperature estimation device) 61, a falling/decreasing temperature estimation device (a second temperature estimation device) 62, an arc-induced rising/increasing temperature estimation device (a third temperature estimation device) 63, a present temperature estimation device (a fourth temperature estimation device) 64, a temperature determination device 65, and a switch control device (a shutoff control device) 66.

The rising/increasing temperature estimation device 61 estimates a temperature increase of the wire 7 at a predetermined sampling rate (e.g. 5 msec). The estimation is based on both a value of the current flowing to the load 4, as measured by the ammeter 5 when the electrical switch is turned ON, and predetermined thermal properties (a thermal resistivity R and a thermal capacity C, as described below) of a conductor including the wire 7 and a contact conductor.

The falling/decreasing temperature estimation device 62 estimates a decrease of temperature of the wire 7 in the predetermined sampling rate. The estimation is based on both an estimated present temperature of the wire 7 and the predetermined thermal properties. Here, the estimated present temperature is determined when the ammeter 5 does not detect the current due to a disconnection between the wire 7 and the contact conductor in the circuit, when the ammeter 5 cannot detect the current after the current is decreased, or when the current starts to decrease.

The temperature of the wire 7 is occasionally increased by arcing which occurs just after the normal current in the load has recovered following a connection between the wire 7 and the contact conductor. The arc-induced temperature estimation device 63 estimates an arc-induced rising/increasing temperature of the wire 7 that is induced by the arcing, based on the current measured just before the normal current has been recovered.

The present temperature estimation device 64 estimates a present temperature of the wire 7 by estimation that is based on temperatures estimated by the rising/increasing temperature estimation device 61, the falling/decreasing temperature estimation device 62, and the arc-induced rising/increasing temperature estimation device 63. The present temperature estimation device 64 includes a memory 64a to store the estimated present temperature.

The temperature determination device 65 compares the present temperature Tnow estimated by the present temperature estimation device 64 with a predetermined maximum allowable temperature (a predetermined threshold temperature), Tth. If the temperature determination device 65 determines that Tnow is higher than Tth, the device 65 outputs a circuit-shutoff signal to the switch control device 66.

The switch control device (shutoff control device) 66 receives the circuit-shutoff signal and then turns off the electrical switch 3 so as to stop supplying power and protect a circuit.

The functional configuration of the control circuit 6 as described above is related only to a configuration applied when the so-called rare-short circuit occurs in the load circuit, and description of the dead-short circuit configuration is omitted.

Next, estimation methods of the rising/increasing or falling/decreasing temperature by the first, second and third temperature estimation devices are explained below.

(A) Estimation of the rising/increasing temperature by the temperature estimation device 61

The temperature of the wire 7 increases by the current flowing therein, this temperature is determined from the formula (1) as follows;

$$T_1 = T_2 + i^2 r \cdot R \cdot \left(1 - e^{-\frac{1}{C \cdot R} \cdot t}\right), \tag{1}$$

wherein T1 is a temperature of the wire [° C]; T2 is an ambient temperature [° C]; i is a current [A]; r is an electric resistance in the conductor [Ω]; R is a thermal resistance of the conductor [° C/W]; C is a heat capacity of the conductor [J/° C or W·sec/° C]; and t is transit time [sec].

In the above formula, the ambient temperature T2 is an initial temperature of the wire 7 when the electrical switch 3 is turn on. For example, T2 may be 25° C in normal circumstances and it may be 85° C in an engine compartment where an engine in a vehicle is running. The current i is determined by a measurement obtained from the ammeter 5. The electrical resistance r is a resistance of the conductor including the wire 7, and is constant. The thermal resistance R is a value indicating the conductor's ability to conduct heat. The thermal resistance R depends on intrinsic properties such as the conductor's material, thickness, and shape. The heat capacity C represents an amount of heat which is required to increase the temperature of the conductor by 1° C. The heat capacity also depends on the intrinsic properties of the conductor.

Consequently, if the current i, and transit time t, are determined the present temperature is estimated by the formula (1).

(B) Estimation of the falling/decreasing temperature by the temperature estimation device 62

If the ammeter 5 does not detect a current or detects that the current decreases, the temperature T1 is determined by taking into account heat radiated from the conductor by a formula (2) as follows;

$$T_1 = T_2 + i^2 r \cdot R \cdot e^{-\frac{1}{CR} \cdot t}, \qquad (2)$$

wherein T1 is the temperature of the wire [° C]; T2 is the ambient temperature [° C]; i is the current [A]; r is the electrical resistance in the conductor [Ω]; R is the thermal resistance of the conductor [° C/W]; C is the heat capacity of the conductor [J/° C or W·sec/° C]; t is the transit time [sec].

In the formula (2), the ambient temperature T2 is the temperature of the wire 7 determined when the ammeter 5 does not detect the current or detects that the current is decreasing. If the temperature of the wire 7 is not saturated, the current i in the formula (2) is defined as a current which would be flowing at this temperature which is assumed to be a saturated temperature in the formula (1). If the temperature of the wire 7 is saturated when the ammeter 5 does not detect the current or detects that the current is decreased, the current i in the formula (2) is defined as a current which is measured just before the ammeter 5 does not detect the current or detects that the current has decreased. Consequently, if the current i and transit time, t, are determined as described above, the present temperature of the wire 7 is estimated by the formula (2).

(C) Estimation of Arc-Induced Rising/Increasing Temperature by the Arc-Induced Temperature Estimation Device 63

Figure 6:
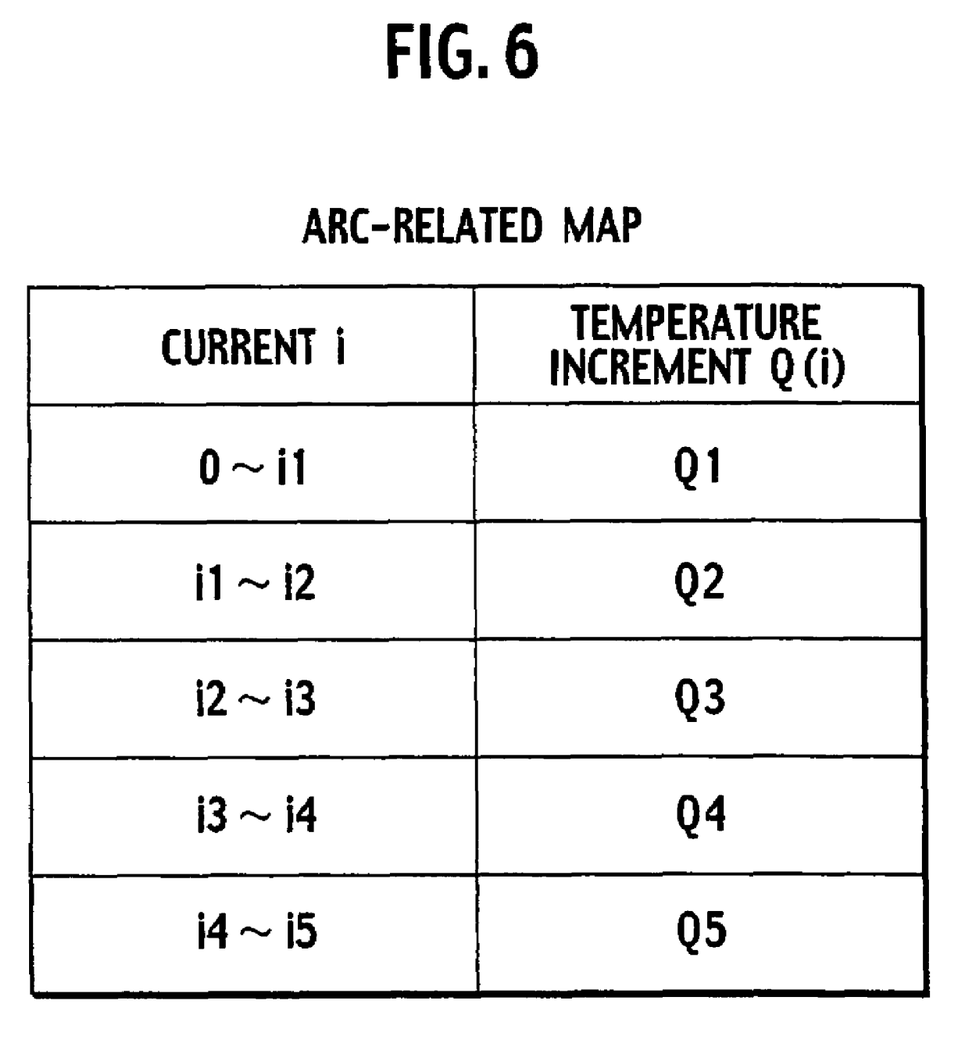
FIG. 6 is an arc-related map stored in a third temperature estimation device.

The memory 64a preliminarily stores data as a arc-related map shown in FIG. 6, which includes a temporal high current i which flows just before the normal current is recovered following connection of the wire 7 with the contact conductor, and a temperature increment Q(i) caused by the temporal high current. Consequently, when the temporal high current i is measured before the normal current is recovered following connection of the wire 7 with the contact conductor, the arc-induced temperature estimation device 63 finds the temperature increment Q(i) from the data, based on the measured temporal high current i, and estimates the arc-induced rising/increasing temperature of the wire 7 based on the following formula (3);

$$T1 = T2 + Q(i) \qquad (3),$$

where the ambient temperature T2 is determined when the normal current is recovered following connection of the wire 7 with the contact conductor.

Figure 3:
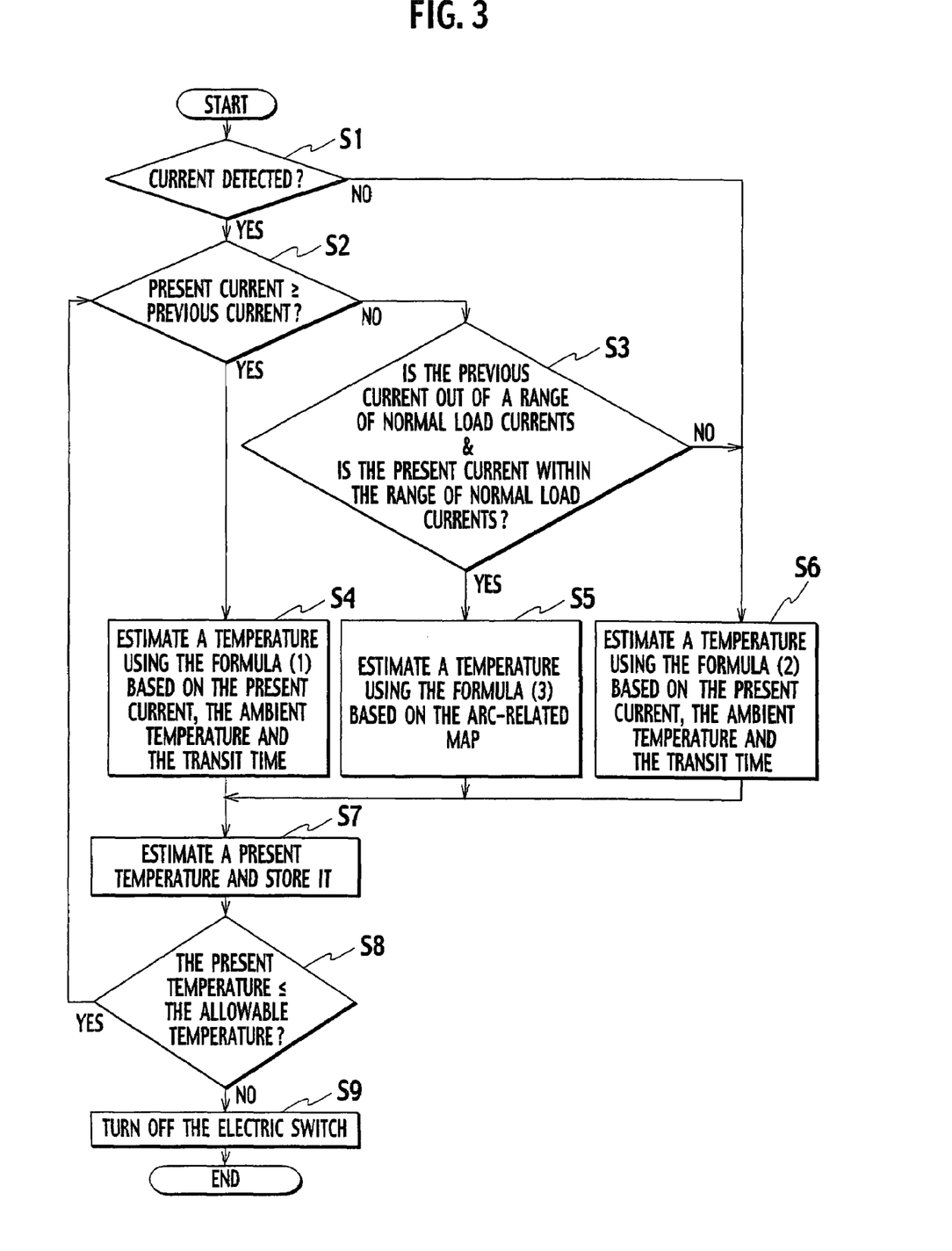
FIG. 3 is a flowchart showing processes performed in the protection device.

Next, an operation of the load circuit 1, according to the embodiment described above, is explained hereinafter with reference to the flowchart shown in FIG. 3. Here, each process shown in this chart is carried out periodically in a predetermined sampling rate (e.g. 5 msec).

First, in step S1, the ammeter 5 determines if a load current is flowing to the load 4. In other words, it is determined if the load current is flowing after the electrical switch 3 is turned on and an electrical connection between the battery 2 and the load 4 is established.

If the ammeter 5 detects the flow of the load current (i.e. "YES" in step S1), in step S2 the load current presently measured is compared with the load current previously measured in a previous sampling sequence.

If the presently measured current is higher than or equal to the previously measured current (i.e. "YES" in the step S2), that is, if it is determined that the present current flowing to the load 4 has been increased or it is constant, the first temperature estimation device 61 starts a timer to record the transit time and estimates the temperature of the wire 7 using the formula (1) (step 4). This estimation is carried out based on both the current measured by the ammeter 5 and the transit time counted by the timer. Meanwhile, the ambient temperature T2 is set to be 25° C as an initial value, for example.

In step S7, the fourth temperature estimation device 64 stores the temperature T1 estimated in the step S4 in the memory 64a as the estimated present temperature of the wire 7, Tnow.

In step S8, the temperature determination device 65 compares Tnow stored in the memory 64a with the predetermined allowable temperature Tth. Then, if Tnow is less than or equal to Tth, the process returns to the step S1 (i.e. "YES" in the step S8).

According to the above steps, if the current flowing to the load 4 is increasing or stable, the successive steps (S1, S2, S4, and S7) are repeated and the temperature of the wire 7 is saturated to temperature T1 as related in the formula (4) described below, which is obtained from the formula (1) by substituting an infinite value in the transit time thereof;

$$T1 = T2 + i^2 \cdot r \cdot R \qquad (4).$$

If the so-called rare-short circuit occurs in the load circuit 1 and the current flowing to the load 4 is increased, the temperature of the wire 7 is increased and Tnow will exceed Tth. In this case, the decision in the step S8 becomes "NO". Accordingly, the switch control device 66 turns off the electrical switch 3 so as to stop supplying the power to the circuit for protection device.

If the presently measured current of the present sampling is less than the previously measured current in the previous sampling (i.e. "NO" in the step S2), it is determined in step S3 if the previously measured current is outside of the range of current in the normal operation and the presently measured current is within the range of current in the normal operation. If arcing has occurred, the answer becomes "YES" and the arc-induced rising/increasing temperature estimation device 63 estimates the arc-induced rising temperature, based on the formula (3) described above with reference to the arc-related map (step S5). That is, the temperature increment Q(i) is determined by applying the measured current, which flows just before the normal current is recovered, to the arc-related map.

In the step S7, the present temperature estimation device 64 adds the estimated temperature increment Q(i) resulting from the above process, to the stored temperature of the wire 7 in the memory 64a, thereby the temperature of the wire 7 is updated. In other words, the temperature stored in the memory 64a in the previous sampling sequence is regarded as the ambient temperature T2, and based on the formula (3) the sum of T2 plus the temperature increment Q(i) becomes the present temperature T1 of the wire. Accordingly, this T1 is stored in the memory 64a as the estimated present temperature Tnow of the wire 7.

Next, if the estimated temperature Tnow is less than or equal to the allowable temperature (i.e. "YES" in step S8), the process returns to the step S1. On the contrary, if "No" is determined in the step S8, the switch control device 66 turns off the electrical switch 3 to shut off the power for the circuit to prevent the load circuit 1 from being overheated.

If "NO" is determined in the step S3, that is, if a condition where the previously measured current is outside of the range of current in the normal operation and the presently measured current is within the range of current in the normal operation (in other words, the condition where the current is steadly decreased without any increase of the current by arcing or the like and "NO" is determined in the step S1 (i.e. no current flowing in the load 4), is not satisfied) the process proceeds to step S6.

In the step S6, the falling/decreasing temperature estimation device 62 initially resets and restarts the timer. Further, it estimates the present temperature of the wire 7, T1, from the formula (2) by substituting the transit time, t, counted by the timer. Here, as described above, the current i used in the formula (2) is defined as a current which would be flowing at this temperature which is assumed as a saturated temperature. If the temperature of the wire 7 is saturated when the ammeter 5 does not detect the current or detects that the current is decreased, the current i in the formula (2) is defined as a current which is measured just before the ammeter 5 does not detect the current or detects that the current has decreased.

Figure 4A:
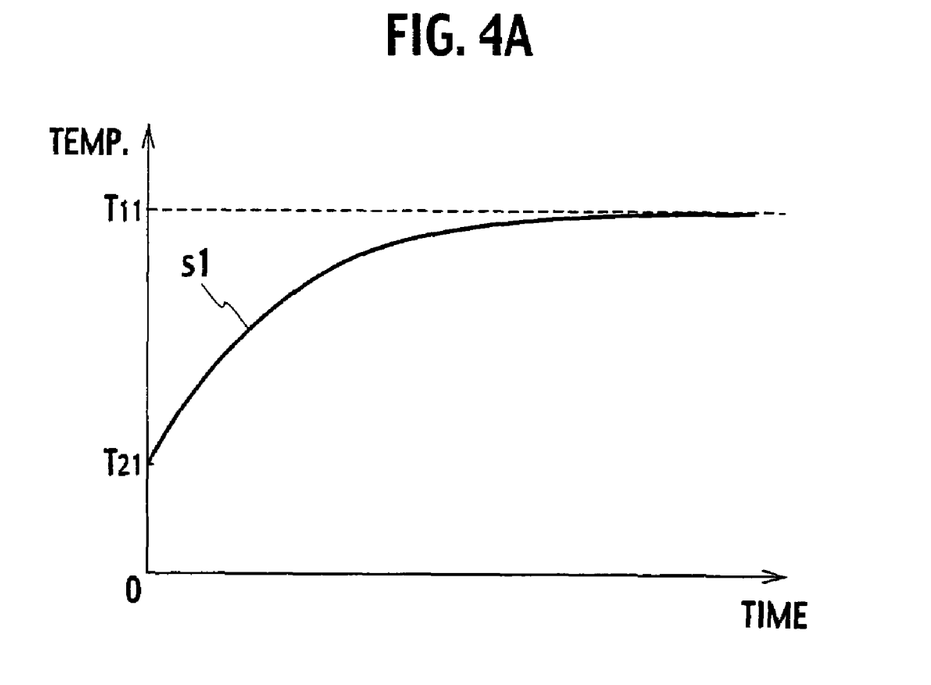
FIG. 4A is a chart indicating variation of a temperature of a wire from in transit time from when a current starts flowing or is increasing in the wire.

Hereinafter, the current i in the formula (2) will be explained in detail. Now it is assumed that the ambient temperature (as an initial temperature of the wire 7) is T21. Next, when a constant current i1 starts flowing continuously, the temperature of the wire 7 starts to increase and it is finally saturated. FIG. 4a shows this behavior of the temperature by a curve s1. As seen in this figure, the temperature gradually increases from T21 and is finally saturated at a temperature T11.

Figure 4B:
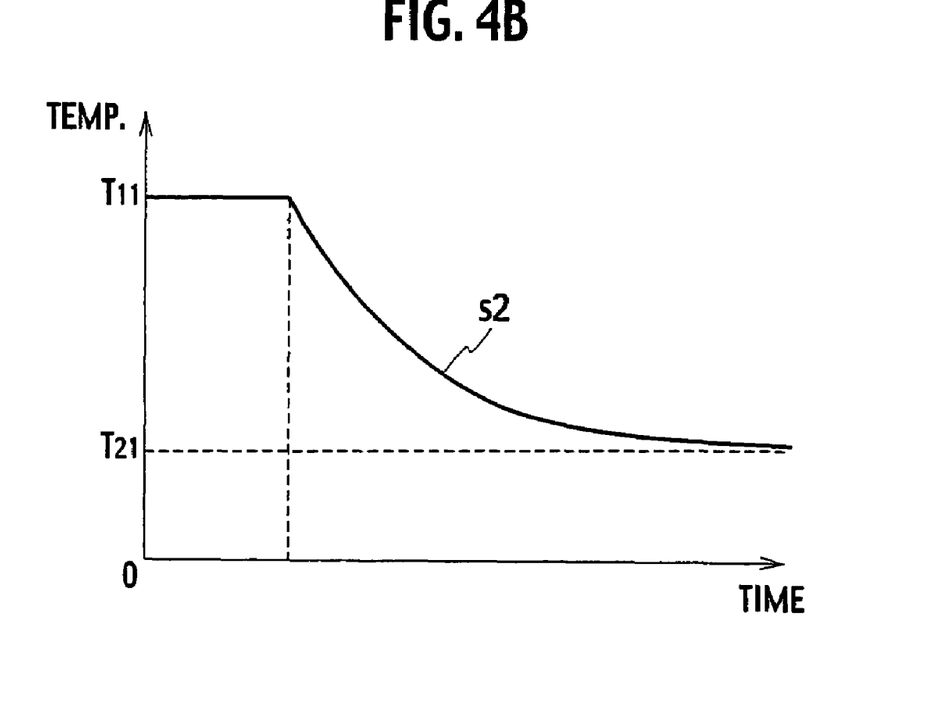
FIG. 4B is a chart indicating variation of the same when the current becomes zero or decreases after the temperature is saturated.

Next, if the ammeter 5 does not detect the current or detects that the current decreases after the temperature of the wire 7 is already saturated to the temperature T11, a current which saturates the temperature of the wire 7 to a temperature T11, and which is measured just before the ammeter 5 does not detect the current or detect that the current is decreased, that is, the current i1 is used as "i" in the formula (2). In this case, as seen in FIG. 4b, the temperature of the wire 7 starts gradually decreasing as a curve s2 obtained by vertical flip of the curve s1. Finally, the temperature is fallen asymptotically to the ambient temperature T21.

Figure 5A:
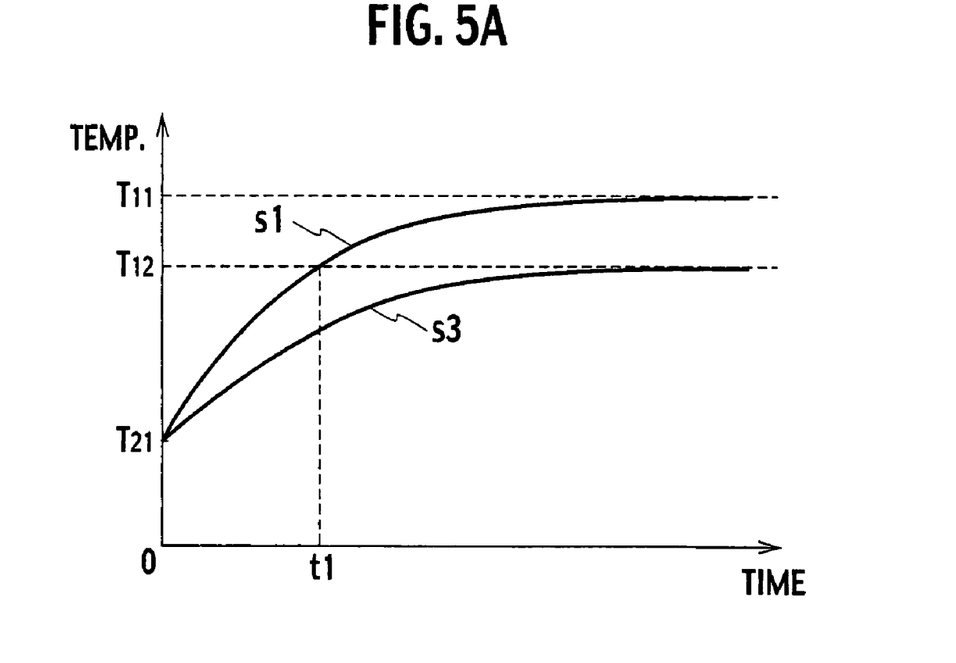
FIG. 5A is a chart indicating variation of the temperature of the wire from in transit time from when a current starts flowing or is increasing in the wire.

If the ammeter 5 does not detect the current or detects that the current is decreased when the temperature of the wire 7 is not saturated yet, that is, as shown in FIG. 5a, if the current is not detected or is decreased at time t1 before the temperature is saturated to the temperature T11, the current, which saturates the temperature of the wire 7 to an instant temperature, is set to be "i" in the formula (2). That is, the current i2 which saturates the temperature of the wire 7 to the instant temperature T12, is estimated (c.f. a curve s3), then this current i2 is used as "i" in the formula (2).

Figure 5B:
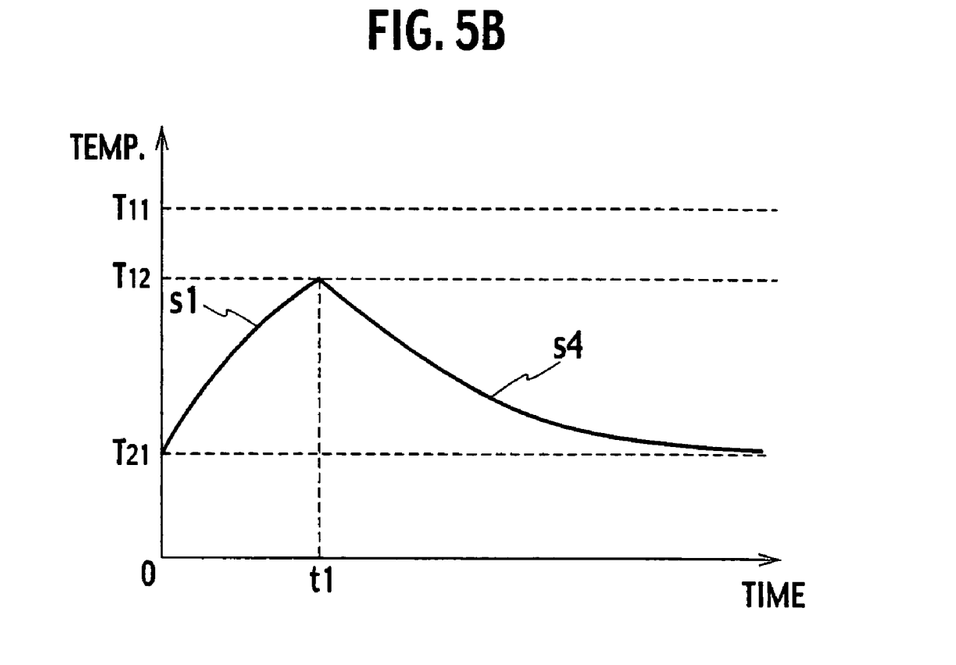
FIG. 5B is a chart indicating variation of the same when the current decreases before the temperature is saturated.

Accordingly, the heat radiation property follows a curve obtained by vertical flip of the curve s3 and the temperature of the wire 7 decreases as a curve s4 shown in FIG. 5b.

Further, if the falling/decreasing temperature is estimated based on the formula (2) in the step S6, the estimated present temperature Tnow, which is stored in the memory 64a of the fourth temperature estimation device 64, is updated in step 7.

That is, the estimated present temperature of the wire 7 Tnow, which is determined by taking into account all of the rising/increasing temperature when the current is increasing, the arc-induced rising/increasing temperature when the arcing occurs, and the heat radiation when the load current is zero or is decreased, is stored in the memory 64a In the step S8, this estimated present temperature Tnow is compared with the allowable temperature Tth. If Tnow is higher than or equal to Tth, the electrical switch 3 is turned off to shut off the power for the load circuit. Consequently, if the rare-short circuit occurs and the temperature of the wire 7 increases, the power for the load circuit can be immediately shut off.

According to the embodiment of the protection device for the load circuit, when the current flowing to the load 4 is increased, it estimates the temperature of the wire 7 based on the formula (1), when the current is zero or the current is decreased, it estimates the temperature of the wire 7 based on the formula (2). When the arcing occurs, it estimates the arc-induced rising/increasing temperature based on the formula (3). Consequently, the device comprehensively estimates the present temperature of the wire 7 from these temperatures described above.

As soon as the estimated present temperature of the wire 7 Tnow achieves the allowable temperature Tth at which a smoke emission from the wire 7 and burnout thereof is induced in the load circuit, the electrical switch 3 is turned off to protect the load circuit. IN more detail, since the protection device estimates the present temperature of the wire 7 based on the intrinsic properties of the wire and determines if the power for the load circuit should be shut off based on the estimated present temperature, it can positively shut off the power to protect the load circuit from emitting smoke from the wire and burnout thereof. Further, the device can prevent unexpected shutoff of the power for the load circuit 1 due to quite low heat generated in the wire 7 by the current flowing to the load circuit 1.

Further, when the current flowing to the load 4 becomes zero or the current starts to decrease, the protection device precisely estimates the falling/decreasing temperature due to the heat radiated from the wire because this estimation is carried out based on the formula (2) in which the current, which is required to be saturated to the temperature just before the current has varied, is used. Consequently, even when the rare-short circuit accidentally occurs, the protection device can positively shut off the power for the load circuit before smoke is emitted from the wire 7 and subsequent burnout thereof.

The protection device for the load circuit by the present invention is explained by the embodiment as shown in the figures. However, the present invention is not limited by the embodiment and each configuration in the present invention may be replaced any one which has same function. For example, the embodiment described above is used for the load circuit 1 for bulbs, motors and the like in vehicles, however, it may be used for other load circuits.

What is claimed is:

1. A protection device for a load circuit including a power supply, a switch and a load, comprising:
   a current detection device detecting and measuring a current in a conductor connected between the power supply and the load;
   a first temperature estimation device that estimates a rising temperature of the conductor, when the current is detected by the current detection device;

a second temperature estimation device that estimates a falling temperature of the conductor when the current detection device fails to detect the current or detects that the current is being decreased, a third temperature estimation device that estimates an arc-induced rising temperature of the conductor that is induced by arcing that occurs just after the current has returned to a normal current;

a fourth temperature estimation device that estimates a present temperature of the conductor based on the estimated rising, falling, and arc-induced rising temperatures;

a temperature determination device that determines whether the present temperature of the conductor estimated by the fourth temperature estimation device exceeds a predetermined threshold temperature;

a shutoff control device that shuts off power to the load circuit when the temperature determination device determines that the present temperature of the conductor exceeds the predetermined threshold temperature, and wherein the rising temperature is estimated based on both the current measured by the current detection device and thermal properties of the conductor;

the falling temperature of the conductor is estimated based on the thermal properties of the conductor; and the arc-induced rising temperature is estimated based on the current just before the current returns to the normal current.

2. The protection device according to claim 1, wherein the thermal properties are thermal resistivity R and heat capacity C.

3. The protection device according to claim 2, wherein the rising temperature estimated by the first temperature estimation device is determined by the following formula;

$$T_1 = T_2 + i^2 r \cdot R \cdot \left(1 - e^{-\frac{1}{C \cdot R} \cdot t}\right),$$

where T1 is a temperature of the conductor [°C], T2 is an ambient temperature [°C], i is the current [A], r is the electrical resistance [Ω] of the conductor, R is the thermal resistivity of the conductor [°C./W], C is the heat capacity of the conductor [J/°C or W-sec/°C], and t is transit time [sec].

4. The protection device according to claim 2, wherein the falling temperature estimated by the second temperature estimation device is determined by the following formula;

$$T_1 = T_2 + i^2 r \cdot R \cdot e^{-\frac{1}{C \cdot R} \cdot t},$$

where T1 is a temperature of the conductor [°C], T2 is an ambient temperature [°C], i is the current [A] required to saturate the temperature of the conductor at which the current is not detected or the current decreases, r is the electrical resistance [Ω] of the conductor, R is the thermal resistivity of the conductor [°C/W], C is the heat capacity of the conductor [J/°C or W-sec/°C], t is transit time [sec].

* * * * *